United States Patent [19]

Colas et al.

[11] Patent Number: 5,556,914
[45] Date of Patent: Sep. 17, 1996

[54] ROOM TEMPERATURE VULCANIZING COMPOSITIONS

[75] Inventors: André R. L. Colas, Glashuetten; Edward A. Joseph, Hofheim, both of Germany

[73] Assignee: Dow Corning GmbH, Rheingaustrasse, Germany

[21] Appl. No.: 409,914

[22] Filed: Mar. 23, 1995

Related U.S. Application Data

[63] Continuation of Ser. No. 125,716, Sep. 24, 1993, abandoned.

[30] Foreign Application Priority Data

Oct. 27, 1992 [GB] United Kingdom .................. 9222593
Dec. 9, 1992 [GB] United Kingdom .................. 9225674

[51] Int. Cl.$^6$ ..................................................... C08K 5/24
[52] U.S. Cl. .......................... 524/731; 524/858; 524/863
[58] Field of Search .................................. 524/863, 858, 524/731

[56] References Cited

U.S. PATENT DOCUMENTS

| | | | |
|---|---|---|---|
| 3,719,634 | 3/1973 | Clark et al. ............................. | 528/18 |
| 4,156,674 | 5/1979 | Sumimura ............................... | 524/863 |
| 4,434,283 | 2/1984 | Sattlegger et al. ..................... | 524/863 |
| 5,247,011 | 9/1993 | Tsuji et al. ............................. | 524/863 |

FOREIGN PATENT DOCUMENTS

| | | | |
|---|---|---|---|
| 0010478 | 4/1980 | European Pat. Off. | ........ C08L 83/04 |
| 147323A3 | 7/1985 | European Pat. Off. | . |
| 0147323 | 7/1985 | European Pat. Off. | ........ C08L 83/04 |

*Primary Examiner*—John C. Bleutge
*Assistant Examiner*—Karen A. Dean
*Attorney, Agent, or Firm*—Robert Spector

[57] ABSTRACT

This application is concerned with room temperature vulcanizing compositions useful as mould making materials which are formed by mixing an alpha, omega dihydroxy polysiloxane, a condensation polydimethylsiloxane, catalyst and a crosslinking agent which comprises a tri- or tetraalkoxy silane or siloxane in which the alkoxy groups contain more than two carbon atoms. Moulds made with these materials on epoxy masters show improved usage; the improvement is related to the size of the alkoxy "leaving group" and the proportion of crosslinker and condensation catalyst.

10 Claims, No Drawings

ROOM TEMPERATURE VULCANIZING COMPOSITIONS

This is a continuation of application Ser. No. 08/125,716 filed on Sep. 24, 1993, now abandoned.

This invention is concerned with room temperature vulcanising polysiloxane compositions and to silicone moulds made therewith.

It is known to employ room temperature vulcanising compositions for the production of flexible silicone rubber moulds for the manufacture of shaped articles. Suitable materials cure without heat via a condensation reaction which involves crosslinking of hydroxy endblocked polysiloxane chains through siloxane linkages accompanied by release of the corresponding alcohol from an alkoxysilane crosslinking agent in presence of a suitable catalyst. These materials are capable of faithfully reproducing details from a surface onto which they are applied to produce the mould.

Thus, the details of wood grain, wood carving, fabrics and the like can be duplicated from a so-called "master" with great accuracy without causing damage to the original positive. Also the flexible mould makes it easier to separate the mould from the moulded or cast part. The flexible moulds also permit complicated or irregularly shaped parts to be moulded in a single moulding operation, because the flexible mould can be bent out of shape during the removal of the moulded part. The mould being flexible will often return to its original shape for further moulding processes. Although the flexible moulds have many desirable features, one disadvantage in using them is that the flexible mould is limited in the number of moulded parts which can be produced from a single mould. It is therefore a practice to make another mould or moulds from the same master to produce a desired quantity of replicas.

Release of the cured silicone rubber mould from a master, made of certain epoxy resin based compounds for example, tends to become more difficult as the number of silicone rubber moulds made from the same master increases until eventually a silicone rubber mould cannot be released from the master. This is very undesirable because the master must be disposed of and a new, costly, master prepared.

It is one object of the present invention to provide a mould making compound which has an improved capability of release from an epoxy master.

Surprisingly, we have now found that this object may be achieved by use of a room temperature vulcanisable composition formed by mixing a composition comprising, inter alia, a diorganopolysiloxane having terminal silicon-bonded hydroxyl groups, a crosslinking agent and a condensation catalyst in which the crosslinking agent comprises a tri- or tetra-alkoxy silane or siloxane in which the alkoxy groups contain more than two carbon atoms.

The invention provides in one of its aspects a room temperature vulcanisable composition formed by mixing components comprising (1) a diorganopolysiloxane having terminal silicon-bonded hydroxyl groups, (2) a crosslinking agent comprising a trialkoxysilane, a trialkoxysiloxane, a tetraalkoxysilane or tetraalkoxysiloxane wherein the alkoxy groups contain more than two carbon atoms, (3) a condensation catalyst and (4) a trialkylsilyl terminated diorganopolysiloxane.

A room temperature vulcanisable composition according to the invention is preferably formed in two separate parts ready for mixing together before use.

The invention also includes a process for the preparation of a mould by mixing in the desired proportions the contents of the hereinabove specified parts and applying it to a body to be duplicated, curing the composition and removing it from the body.

Hydroxyl-terminated diorganopolysiloxanes which are employed as component (1) of the preparations of this invention are well-known materials and may be any of those known to be suitable for use in the formulation of two-package, room temperature vulcanising compositions. Such materials may be described as substantially linear diorganopolysiloxanes containing two, or approximately two, terminal silanol (—SiOH) groups per molecule.

The silicon-bonded groups present in the diorganopolysiloxane (1) are selected from monovalent hydrocarbon groups, monovalent halogenated hydrocarbon groups and cyanoalkyl radicals. Examples of the organic radicals which may be present are alkyl radicals such as methyl, ethyl, propyl, butyl, dodecyl or octadecyl radicals, alkenyl radicals such as vinyl, allyl and cyclohexenyl, aryl radicals such as phenyl and naphthyl and halogenated hydrocabon radicals such as chlorophenyl, bromomethyl and trifluoropropyl radicals.

The hydroxyl terminated diorganopolysiloxanes may vary in viscosity from freely-flowing liquids to barely-flowable gums. Preferably, however, the viscosity of the diorganopolysiloxane lies within the range from 500 to 60,000 cSt at 25° C. Most preferred hydroxyl terminated diorganopolysiloxanes are of the formula HO—[—Me$_2$SiO—]$_m$—H wherein Me represents the methyl radical and m has a value such that the viscosity of the diorganopolysiloxane lies within the range from 500 to 60,000 cSt at 25° C.

The crosslinking agents (2) of a composition according to the invention are tri- or tetra-alkoxy silanes or siloxanes. The silanes are preferred with any remaining valencies satisfied by aryl or alkyl groups as exemplified by tetrapropoxysilane and tetrabutoxysilane. Better release from the epoxy mouldings is achieved as the size of the alkoxy groups is increased from the lower chain length homologues methoxy and ethoxy to propoxy and butoxy and the size of the condensation by-product i.e. alcohol molecule released during the condensation reaction is correspondingly increased. Preferably the proportion of crosslinking agent employed lies in the range from 6 to 50 moles per mole of polysiloxane (1).

As the condensation catalyst (3) there may be employed one or more of organic acids, bases and metal salts of carboxylic acids. Such materials and their use as catalysts in two-package cold-curable systems are well-known and the choice of the most suitable catalysts for a particular formulation or application will be readily apparent to those skilled in the art. The preferred catalysts are the metal salts of carboxylic acids, for example zinc naphthenate, lead octoate, stannous acetate, dibutyltin dilaurate, dibutyltin diacetate and dioctyltin diacetate, the most preferred of these being the organo tin salts. If desired more than one type of condensation catalyst may be present as component (3). Preferably the proportion of catalyst is comparatively high and lies in the range from 1.0 to 8.0 moles per mole of polysiloxane (1).

Component (4) of the composition of this invention is a trialkylsilyl diorganopolysiloxane. This component serves as a diluent for the composition and also assists mould release properties. These materials are well-known in the art. They may be present in a proportion of 50 to 200 parts by weight per 100 parts by weight of component (1).

The silicon-bonded groups in the diorganopolysiloxane (4) may be selected from monovalent hydrocarbon radicals, monovalent halogenated hydrocarbon radicals and cyanoalkyl radicals as specified in respect of the hydroxylated diorganopolysiloxane (1) and as hereinbefore exemplified. Preferably the organic radicals are selected from methyl, phenyl, vinyl and trifluoropropyl radicals, at least about percent of the radicals being methyl radicals. The polydiorganosiloxanes (4) may vary in viscosity from freely-flowing liquids having a viscosity of less than 10 cSt to highly-viscous materials. Preferably they are chosen from the lower end of the viscosity scale, that is from about 20 to 400 cSt.

In addition to the specified components (1), (2), (3) and (4) the compositions of this invention may contain finely divided fillers and other additives, for example heat stability additives, dyes, plasticisers and pigments. Any of a wide variety of inert organic and inorganic filler materials may be employed including for example diatomaceous earths, crushed quartz, calcium carbonate, titania, zirconium silicate and ferric oxide. When a filler is present at least a major proportion of it is preferably packaged in admixture with the polydiorganosiloxane (1).

A composition according to the invention is preferably in two separate parts for admixture to provide a room temperature vulcanising composition. Generally, one of the two parts (the curing agent) will contain the cross-linking agent (2) and the catalyst (3).

The curing agent composition comprising (2) and (3) is sensitive to water, particularly when a highly active catalyst such as stannous octoate is present therein. It is therefore preferably prepared and maintained in a substantially anhydrous condition if it is to be stored for a significant time prior to use.

The preparations of this invention may be employed in any of the wide variety of applications known for the room temperature curing organosiloxane compositions, for example as coating, caulking and insulating materials, and in the preparation of flexible moulds.

The following examples in which the parts are expressed as parts by weight illustrate the invention.

EXAMPLE 1

100 parts by weight of a base component (hereinafter called RTV base 1) of a room temperature vulcanisable (RTV) composition formed from 100 parts ($1 \times 10^{-1}$ moles) of an alpha, omega dihydroxypolydimethylsiloxane having a viscosity of 50,000 cSt, 198 parts of a trimethylsilyl end-capped polydimethylsiloxane having a viscosity of 50 to 350 cSt and 100 parts of finely divided mineral filler were mixed with the weight of a curing agent component of the RTV comprising a tri- or tetra-alkoxysilane and dibutyltindilaurate as shown in Table 1. The composition of the curing agent part was varied as shown in Table 1, both with regard to the type and amount of silane cross-linker, and also with regard to the amount of dibutyltindilaurate.

The silane crosslinkers used and listed in Table 1 have the following formulae:

| | |
|---|---|
| PTM refers to phenyltrimethoxysilane | $C_6H_5Si(OCH_3)_3$ |
| TEOS refers to tetraethoxysilane | $Si(OC_2H_5)_4$ |
| EPS refers to a silane mixture consisting of 30 weight % TEOS and 70 weight % ethylpolysilicate | $C_2H_5O(SiO)_nC_2H_5$ with $OC_2H_5$ groups |
| nPOS refers to tetrapropoxysilane | $Si(OC_3H_7)_4$ and |
| TBOS refers to tetra-n-butoxysilane | $Si(OC_4H_9)_4$ |

For the release trials a series of master mouldings were prepared from commercially available epoxy resin (Sikagard® 63, two-component green epoxy resin manufactured by Sika Inertol). The epoxy master moulding had a shape as shown in FIG. 1 and a length of 6 to 8 cm, a width of 5 cm and four parallel grooves (10) 0.5 cm deep extending length-wise of the master formed in an upper surface (12) of the master.

When mixed, each RTV base catalysed with a given curing agent composition, was cast onto four of the epoxy resin masters. The silicone elastomer was cast on top to totally cover the master and fill all of its grooves and to a depth of 5 mm above the upper surface (12). The castings of RTV so formed were cured at room temperature for 24 hours to provide cured silicone rubber layers approximately 5 mm thick minimum. Each silicone rubber casting was stripped from its master by hand. The preparation of silicone rubber castings in this way was repeated seriatim using freshly mixed composition of the same formulation for each master to provide series of silicone rubber castings using each curing agent part. The average number of silicone rubber releases made with a given RTV curing agent composition before adhesion to the master was seen is recorded in Table 1. For cases where no adhesion was seen the evaluation was stopped after 40 silicone rubber releases had been made on each master.

TABLE 1

Number of Releases obtained with a given RTV curing agent Composition and RTV Base 1

| Crosslinker Name (Functionality) | Amount | Tin Catalyst Amount | Releases |
|---|---|---|---|
| PTM (—OCH$_3$) | 8.0 | 0.222 | 3 |
| | 8.0 | 0.317 | 4 |
| EPS OC$_2$H$_5$) | 9.8 | 0.317 | 4 |
| | 9.8 | 1.257 | 24 |
| nPOS (—OC$_3$H$_7$) | 6.4 | 1.257 | 40 |
| | 7.1 | 0.317 | 14 |
| | 7.1 | 0.633 | 20 |
| | 9.8 | 0.633 | 8 |
| | 9.8 | 0.950 | 20 |
| TBOS (—OC$_4$H$_9$) | 6.4 | 0.950 | 40 |
| | 6.4 | 1.257 | 40 |
| | 9.8 | 0.950 | 28 |
| | 9.8 | 1.257 | 37 |

Note: amounts refer to g-moles $\times 10^{-3}$ of given component per 100 g of the RTV base As can be seen from the Examples increasingly better release is obtained as the leaving groups functionality in the crosslinker progresses from the lower chain homologues, methoxy and ethoxy, to propoxy and butoxy. The proportion of crosslinker, and particularly the proportion of condensation catalyst used, in this case dibutyltindilaurate, also play a role. Thus, best release is obtained when a) the leaving group in the crosslinker is a higher molecular weight alcohol, b) the amount of condensation cure catalyst is high, and c) the concentration of crosslinker is small.

That which is claimed is:

1. A room temperature vulcanizable composition formed by mixing components consisting essentially of (1) a diorganopolysiloxane having terminal silicone bonded hydroxyl groups; (2) as the sole crosslinking agent at least one compound selected from the group consisting of trialkoxysilanes and tetraalkyoxysilanes wherein the alkoxy groups of said crosslinking agent contain more than two carbon atoms and said composition contains from 6 to 50 moles of crosslinking agent per mole of said diorganopolysiloxane, (3) 1 to 8 moles, per mole of said diorganopolysiloxane, of a condensation catalyst and (4) 50 to 200 parts by weight, per 100 parts by weight of said diorganopolysiloxane, of a trialkylsilyl-terminated diorganopolysiloxane.

2. A composition according to claim 1 wherein cured elastomers prepared by curing said composition, while said composition is in contact with a mold-making master, are easily releasable from said molding making master.

3. A composition according to claim 2 wherein said masters are formed from an epoxy resin.

4. A room temperature vulcanising composition according to claim 1 wherein the composition is formed in two separate parts ready for mixing together before use.

5. A composition according to claim 1 wherein the cross-linking agent is selected from the group consisting of tetrapropoxysilane and tetra-n-butoxysilane.

6. A composition according to claim 1 wherein the condensation catalyst comprises a dialkyl tin salt of a carboxylic acid.

7. A composition according to claim 6 wherein from 1 to 8 moles of condensation catalyst per mole of polysiloxane (1) are present.

8. A composition as claimed in claim 1 wherein the diorganopolysiloxane (1) is a dimethylpolysiloxane having a viscosity within the range from 500 to 60,000 cSt at 25° C.

9. A composition as claimed in claim 1 wherein the polydiorganosiloxane (4) has a viscosity within the range from 20 to 4,000 cSt at 25° C.

10. A composition as claimed in claim 1 which also contains a filler, at least a major proportion of the said filler being present in admixture with the diorganopolysiloxane (1).

* * * * *